D. KALTENBACHER.

BLINDER FOR BRIDLES.

No. 10,569. Reissued Mar. 10, 1885.

WITNESSES:

Chas. Nida

C. Sedgwick

INVENTOR:

D. Kaltenbacher

BY Munn & Co

ATTORNEYS.

N. PETERS, Photo-Lithographer, Washington, D. C.

UNITED STATES PATENT OFFICE.

DOMINICK KALTENBACHER, OF SHELBYVILLE, KENTUCKY.

BLINDER FOR BRIDLES.

SPECIFICATION forming part of Reissued Letters Patent No. 10,569, dated March 10, 1885.

Original No. 281,080, dated July 10, 1883. Application for reissue filed August 29, 1884.

*To all whom it may concern:*

Be it known that I, DOMINICK KALTENBACHER, of Shelbyville, in the county of Shelby and State of Kentucky, have invented a new and useful Improvement in Blinders for Bridles, of which the following is a full, clear, and exact description.

This invention pertains to improvements in blinders for bridles; and it consists in a stay-loop of novel construction, and in the combination and arrangement of parts, substantially as hereinafter fully set forth and claimed.

Reference is to be had to the accompanying drawings, forming part of this specification, in which similar letters of reference indicate corresponding parts in all the figures.

Figure 1:
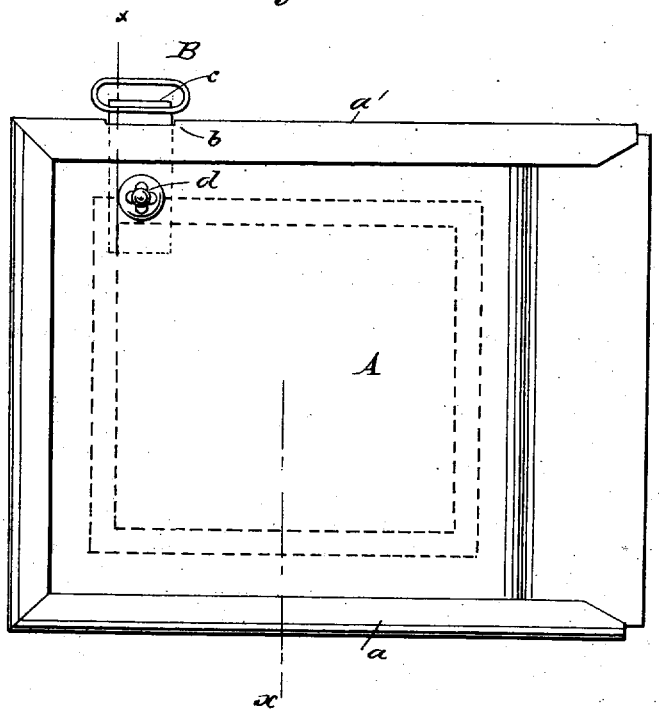
Figure 2:
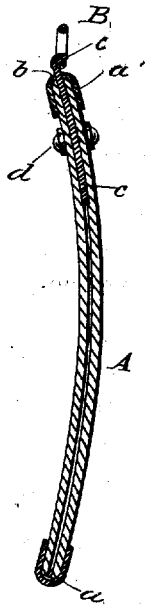
Figure 3:
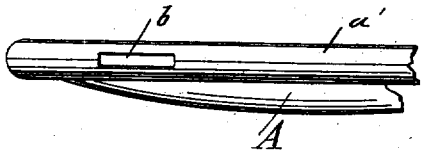

Figure 1 is a front elevation of my new and improved blinder. Fig. 2 is a sectional elevation thereof, taken on the line *x x* of Fig. 1; and Fig. 3 is a detail plan view showing the slot in the metallic binding in which the metallic stay-loop is placed.

The main leather part or body A of the blinder may be of any approved form or construction, and will be stitched or secured by rivets to the cheek-pieces of the bridle in the ordinary way. At the upper, lower, and outer edges of the blinder I secure the metallic binding *a a'*, the edges of which are pressed down upon the material of the blinder, so as to grasp the edges of the blinder and finish it at the edges. The upper strip of binding, *a'*, has the slot *b* formed in it near the outer edge of the blinder, as shown clearly in Fig. 3, which slot is for the purpose of receiving the plate *c* of the metal loop B, into which the blinder-stay of the bridle is to be attached. The plate *c*, after being forced down through the slot *b* and between the two pieces of leather that compose the body A of the blinders, is held there preferably by the rivet *d*, which has the ornamental heads, as shown in Figs. 1 and 2. Constructed in this manner, the edges of the blinder may be finished with much less labor than by the old method of stitching, and the blinder is made much stronger, especially at the point where the loop of the blinder-stay is attached, and is made more ornamental than by the old style of finish, and the metallic blinder stay-loop is of great advantage, since by its use the trouble and annoyance of the blinder-stay breaking loose from the blinder are entirely obviated.

Having thus described my invention, what I claim as new, and desire to secure by Letters Patent, is—

1. The combination, with a blinder having a slotted binding, of the metallic stay-loops B, provided with a securing-plate passing through the slotted binding into the space between the two parts of the blinder, substantially as and for the purposes set forth.

2. In a bridle-blinder, the combination, with the two-part blinder and the metallic binding having a slot therein, of the stay-loop having its plate inserted through the said slot and secured between the two parts of the blinder, substantially as and for the purpose set forth.

D. KALTENBACHER.

Witnesses:

J. F. SIMRALL,

JOHN T. MIDDELTON.